United States Patent [19]
Lynch et al.

[11] Patent Number: 4,477,273
[45] Date of Patent: Oct. 16, 1984

[54] METHOD OF AND APPARATUS FOR STRAIGHTENING AND CONFIGURING A PREFORM TUBE FROM WHICH LIGHTGUIDE FIBER IS DRAWN

[75] Inventors: Brian Lynch, Norcross; Fred P. Partus, Marietta, both of Ga.

[73] Assignee: AT&T Technologies, Inc., New York, N.Y.

[21] Appl. No.: 388,561

[22] Filed: Jun. 15, 1982

[51] Int. Cl.³ .............................................. C03B 23/04
[52] U.S. Cl. ..................................... 65/3.12; 65/18.2; 65/13; 65/109; 65/110; 65/120; 65/157; 65/271; 65/272; 65/276; 65/279; 65/356; 65/374.15; 65/102
[58] Field of Search ...................... 65/3.11, 3.12, 18.2, 65/102, 108, 109, 110, 120, 157, 271, 272, 275, 276, 279, 356, 374.15, 13

[56] References Cited

U.S. PATENT DOCUMENTS

| | | | |
|---|---|---|---|
| 3,427,143 | 2/1969 | Deery et al. | 65/279 |
| 4,010,022 | 3/1977 | Schul | 65/109 |
| 4,231,777 | 11/1980 | Lynch et al. | 65/271 X |
| 4,247,319 | 1/1981 | Hofmann | 65/109 |
| 4,276,243 | 6/1981 | Partus | 261/128 |
| 4,278,459 | 7/1981 | Partus | 65/3.12 X |

FOREIGN PATENT DOCUMENTS

| | | |
|---|---|---|
| 2266668 | 10/1975 | France ................. 65/3.12 |
| 49-49168 | 12/1974 | Japan . |
| 734461 | 8/1955 | United Kingdom . |
| 724463 | 3/1983 | U.S.S.R. . |

OTHER PUBLICATIONS

Partus et al., "Lightguide Preform Manufacture", Western Electric Engineer, vol. 24, No. 1, Winter 1980, pp. 39-47.
Smithgall et al., "Drawing Lightguide Fiber", Western Electric Engineer, vol. 24, No. 1, Winter 1980, pp. 49-61.

Primary Examiner—William F. Smith
Attorney, Agent, or Firm—E. W. Somers

[57] ABSTRACT

A preform from which lightguide fiber is drawn is made by depositing optically suitable layers of doped silicon dioxide on an inner wall of a rotating glass substrate tube which is exposed to a moving zone of heat during a deposition mode and during a collapse mode. During at least a first pass following the deposition mode, a contact device is caused to engage each successive increment of length of the tube during exposure to the zone of heat. The contact device causes any sagged or offset portions of the tube to be reconfigured and causes the tube to have a central longitudinal axis which is a straight line which extends between stocks of a lathe by which ends of the tube are supported. The contact device may also be used to cause the tube to have a predetermined configuration along its length. The position of the contact device relative to the maximum temperature within the moving zone of heat for each increment of length of the glass tube allows the shape of the tube to be changed and allows that shape to be retained.

32 Claims, 11 Drawing Figures

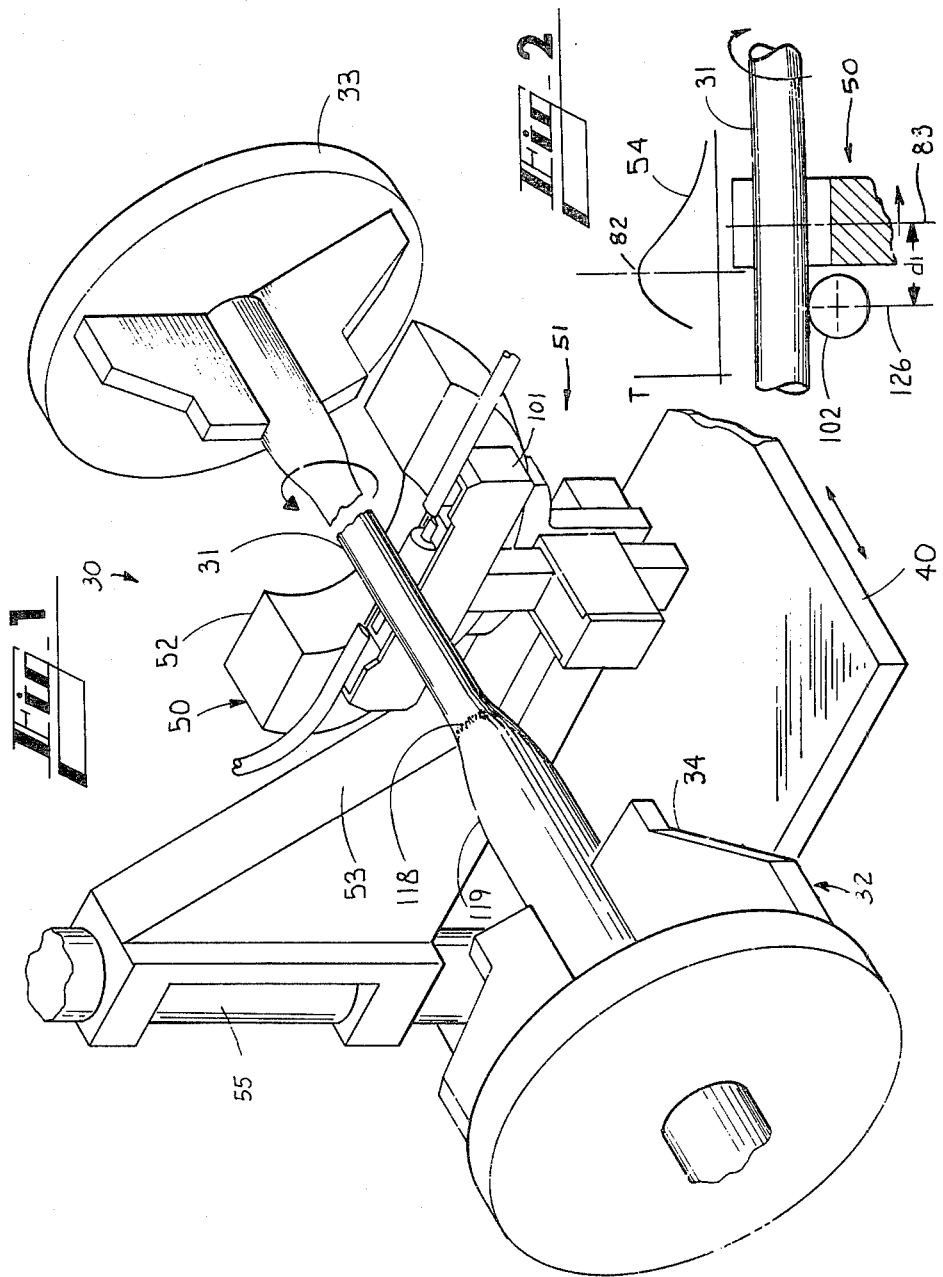

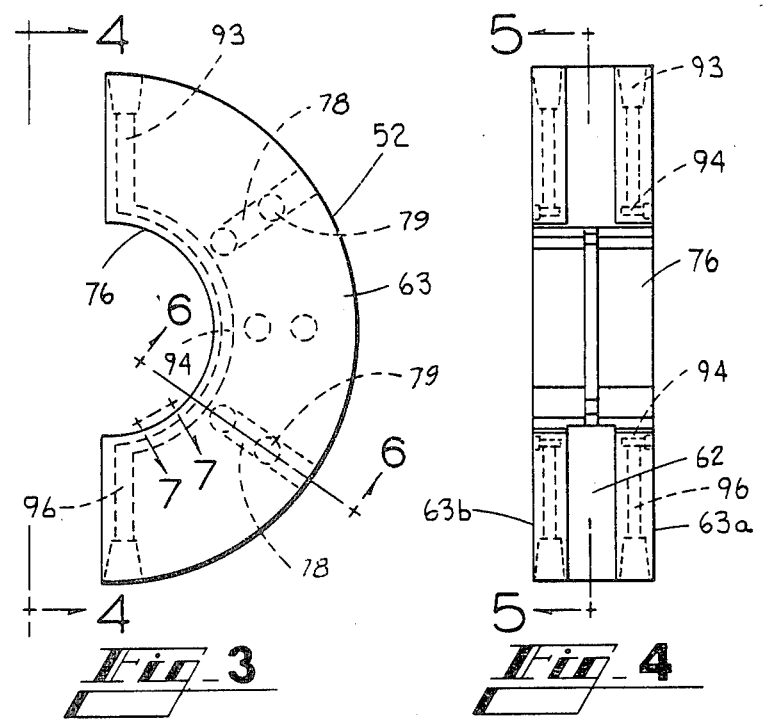
Fig_3
Fig_4
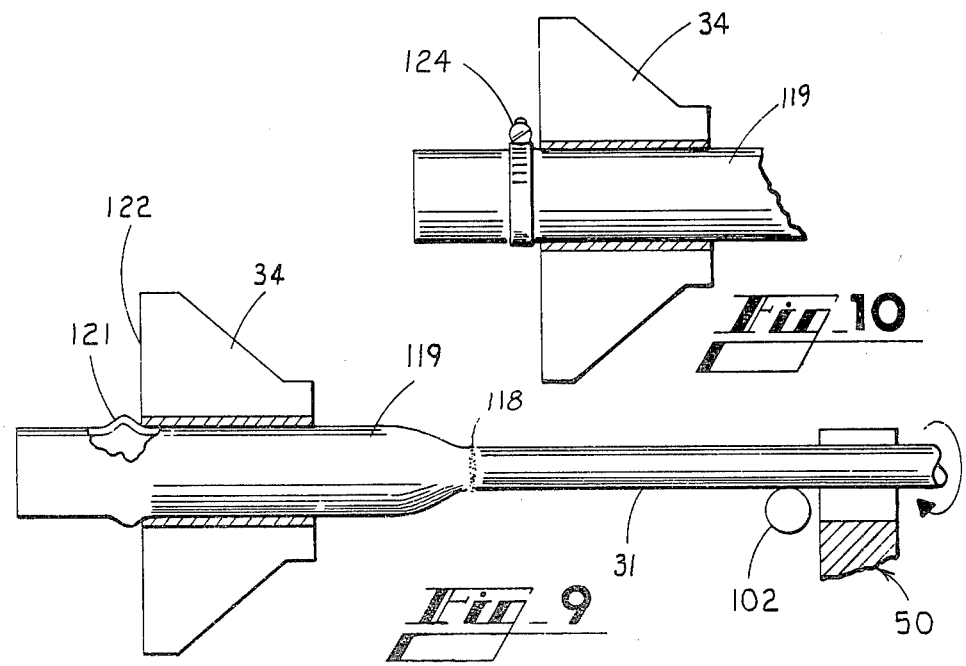
Fig_10
Fig_9

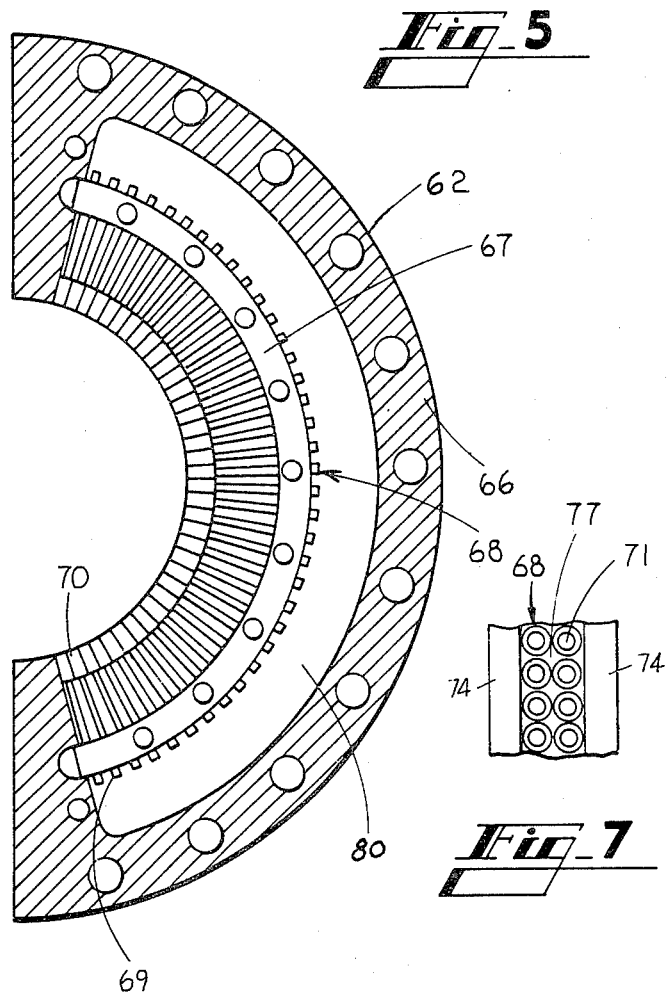
Fig_5
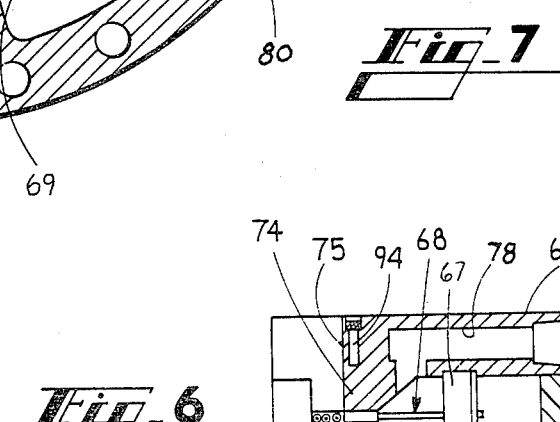
Fig_7
Fig_6
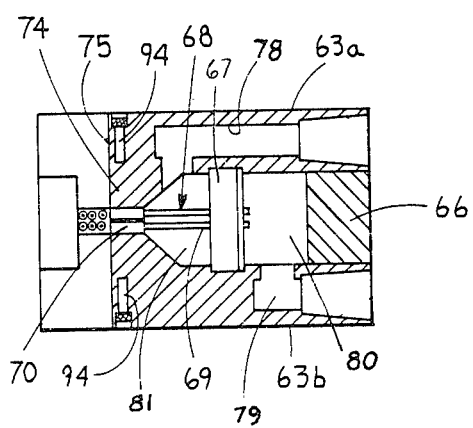

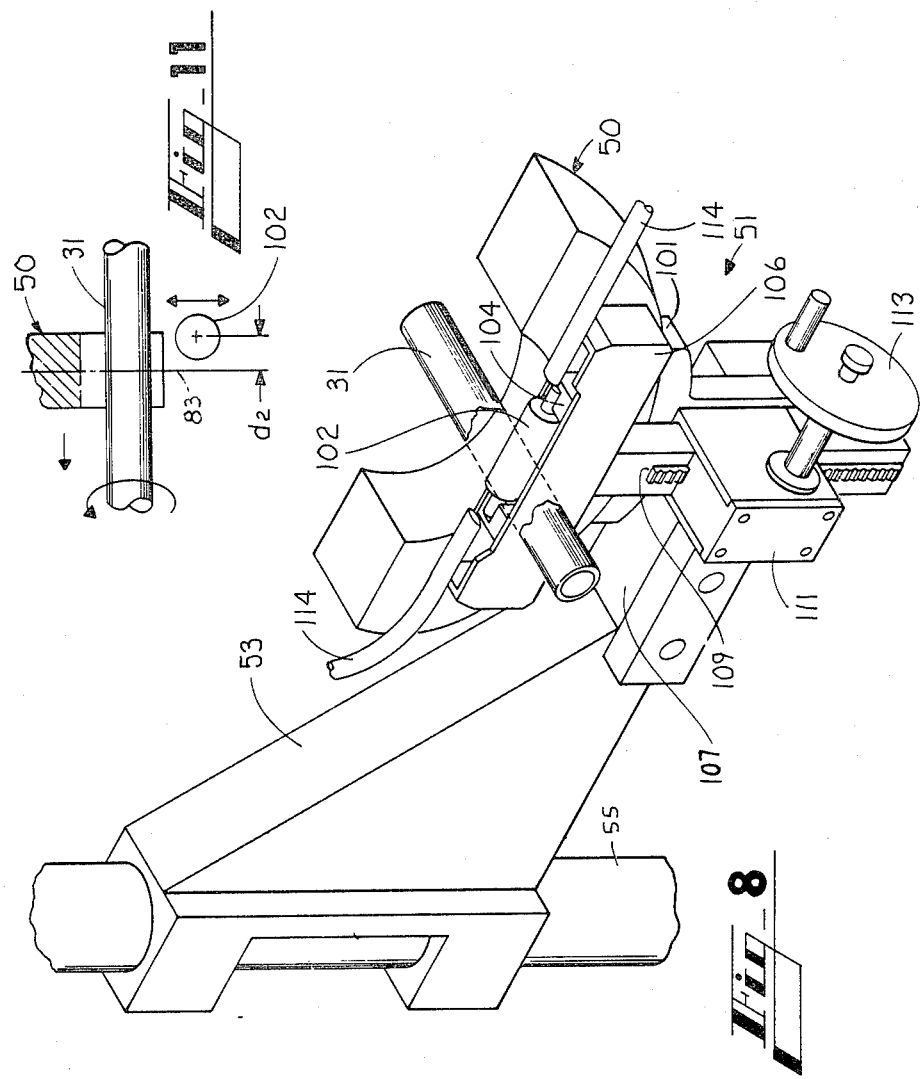

METHOD OF AND APPARATUS FOR STRAIGHTENING AND CONFIGURING A PREFORM TUBE FROM WHICH LIGHTGUIDE FIBER IS DRAWN

TECHNICAL FIELD

This invention relates to methods of and apparatus for straightening and configuring an elongated glass substrate. More particularly it relates to methods of and apparatus for causing a preform from which lightguide fiber is drawn to be substantially straight along an axis which extends between its ends and to have a substantially constant outer diameter.

BACKGROUND OF THE INVENTION

There are several different techniques for producing a lightguide fiber for use in communications. One such technique comprises directing a constantly moving stream of reactants and oxygen through a glass substrate tube having a generally circular cross-section. The tube may be made of silicon dioxide, for example, and the reactant, silicon tetrachloride. The oxygen stream will also carry dopants to produce the appropriate or desired index of refraction in the finished lightguide fiber. The substrate glass is heated to a reaction temperature within a moving hot zone that traverses the outside of the tube, and the consequent reaction produces silicon dioxide and dopants fused into a continuous layer on the inner wall of the tube. The resulting tube is referred to as a preform tube.

A torch assembly for heating a glass substrate tube to facilitate deposition is described in U.S. Pat. No. 4,231,777 which issued on Nov. 4, 1980, in the names of B. Lynch and F. P. Partus. A plurality of nozzles which are disposed radially of a rotatably supported glass substrate tube open to an arcuate surface of a housing that is mounted on a carriage and that is spaced a predetermined distance from the tube to be heated. Initially, one end of the tube is supported in the headstock of a lathe and the other end is welded to an exhaust tube that is supported in the tailstock. Combustible gases are directed through the nozzles and toward the tube as it is turned rotatably about its longitudinal axis and as the torch assembly is moved therealong to produce a hot zone. A temperature profile is produced across the hot zone which moves along on the surface of the tube, and, hence inside the tube, with a peak value sufficient to accomplish the desired reaction and deposition. See F. P. Partus and M. A. Saifi "Lightguide Preform Manufacture" beginning at page 39 of the Winter 1980 issue of the *Western Electric Engineer*.

During a deposition mode, the torch carriage moves slowly from the headstock of the lathe where dopants are moved into the glass tube to the tailstock where gases are exhausted. At the end of each pass from headstock to tailstock, the torch carriage is returned rapidly to the headstock for the beginning of another cycle. The housing and the ends of the nozzles at least adjacent to the tube are cooled to an extent sufficient to eliminate substantially degradation such as, for example, by oxidation or reduction, of the material forming the housing and passageways.

Subsequent to the deposition mode, a collapse mode is used to collapse the prefrom tube into a rod-like member which is called a preform. It is this preform from which lightguide fiber is drawn. See D. H. Smithgall and D. L. Myers "Drawing Lightguide Fiber" beginning at page 49 of the hereinbefore identified Winter 1980 issue of the *Western Electric Engineer*.

There is still a need for improvement in the preforms manufactured by the above-described technique. It is not uncommon for the tube to become oval or to develop a bow or offset during deposition. The sag or offset that may develop during the deposition mode and any inherent tube ovality may be aggravated during collapse. This may occur, because during collapse when the torch carriage is moved and the tube is rotated more slowly, the temperatures of the preform tube are higher than during deposition. Non-straight preforms may not meet manufacturing specifications and be rejected or they may limit the amount of fiber which can be drawn therefrom. The bowed preforms that are drawn require constant operator monitoring and adjustment of a device which centers the preform with respect to a furnace that heats the preform during a drawing operation.

Other techniques in the preform tube manufacturing process contribute to its tendency to sag or to develop an offset. For example, during each return pass, the oxygen in the torch is vented with only the hydrogen gas being burned. At the headstock end, prior to the beginning of the next deposition pass, there is a sudden surge of oxygen gas. After a suitable delay, the carriage begins its next deposition pass. During each deposition pass, a pyrometer detects the surface temperature of the glass tube. The oxygen surge may cause the initial surface temperature of the glass to be greater than that required for suitable reaction. This is detected by the pyrometer which causes gas flow controllers to automatically reduce gas flow to the torch. Although the pyrometer and gas flow controllers react to excessive temperatures, the localized excess heat increases the probability for sag of the tube which is supported only at its ends. Should sag or offset develop, its severity may worsen as the deposition continues and as the tube is collapsed.

Any offset which is developed at the headstock end of the tube, if severe enough, causes oscillation of the gas flow controllers. During rotation, the offset causes part of the tube to be closer to the torch than the other part of the tube. As a result, the pyrometer, which is connected through a feedback loop to the gas flow controllers, detects, in rapid succession, fluctuating surface temperature values which cause the gas flow controllers to oscillate between positions which allow more or less gas to flow to the torch. This results in unacceptable deposition until the torch and pyrometer reach a portion of the tube that is substantially straight.

It will be recalled that the substrate tube is welded to the exhaust tube which is held in a chuck of the lathe tailstock. If the weld is such that either or both the substrate tube and the exhaust tube are eccentric to the longitudinal axis between the lathe chucks, sag or offset is imparted to the tube at the headstock end. This occurs because of the described delay, the localized heating and the longitudinal transfer of cranking motion to the softened glass zone adjacent to the headstock prior to the beginning of another pass.

Another problem relates to the cross-sectional configuration of the preform tube along its length. Often, the outer diameter of the substrate tube is not constant. Moreover, the cross-section of the tube may not be circular but may be oval-shaped. It is most desirable to correct these problems prior to the deposition mode. Conversely, it would also be desirable to be able to configure the tube in a predetermined manner such as, for example, to provide a gently tapered preform tube.

What is needed and what is not provided by the prior art are methods and apparatus for heating a glass tube to provide a substantially straight preform having a predetermined cross-sectional configuration along its length. The sought after methods and apparatus should be capable of straightening oval tubes and circular cross-section tubes in which the diameter varies along the tube. Also, the sought after methods and apparatus for straightening glass tubes should be such that other defects are not introduced into the tubes and should be capable of being integrated with the presently used torch.

SUMMARY OF THE INVENTION

The foregoing problems have been overcome by the methods and apparatus of this invention. A method of configuring an elongated glass substrate from which lightguide fiber is drawn includes the steps of supporting the substrate at its ends for rotation. Each successive increment of length of the substrate is exposed to a zone of heat having a temperature profile by causing continuous relative motion between the zone of heat and the substrate while the substrate is being rotated by turning its supported ends. As the substrate is rotated, it is caused to have a central longitudinal axis which is a substantially straight line and to have a predetermined configuration along its length by applying forces in a reproducible manner to the successive increments of length during exposure to and in fixed relation to the zone of heat.

In the manufacture of a preform tube from which lightguide fiber is drawn, a substrate tube, having a generally circular cross-section, is supported rotatably at its ends. The substrate tube is turned rotatably and heated to an initial temperature while doped reactants are deposited in the tube to form a predetermined profile. During deposition, the temperature of the tube is reduced from the initial temperature as the number of passes increases. Then, the outer surface of the tube is heated to a temperature within a range which is higher than the initial temperature by a zone of heat which is moved along the tube. At a predetermined location relative to the zone of heat, successive increments of the tube are engaged by a contact device which causes each successive increment to be disposed substantially concentrically about an axis extending between the supported ends of the tube. In a preferred embodiment, the article is engaged by a roller having a cooled surface.

In an apparatus for straightening an elongated glass preform tube having a circular cross-section, facilities are provided for holding ends of the preform tube for rotation about a longitudinal axis between its ends. The apparatus includes a torch for heating the preform tube. The torch includes means for directing a flow of combustible gases toward the preform tube. Relative motion is caused between a zone of heat which is produced by the torch and the preform tube to cause successive increments of length of the preform tube to be heated while it is turned rotatably. A contact device adjacent to the torch and moved therewith applies forces to successively heated increments of length of the preform tube with sufficient force to cause each successive increment to be disposed substantially concentrically about the axis which extends through the holding facilities at its ends. The engagement of the contact device with the preform tube may be controlled to configure the tube to have a predetermined configuration along its length. The engagement of the contact device with the tube also causes the tube to begin its collapse into a preform from which the lightguide fiber is drawn. The engagement of the contact device with each increment of the preform tube occurs at a point within the zone of heat such that the tube is capable of being reconfigured. The arrangement of the torch and the contact device is such that each successively reconfigured increment undergoes a set to retain its straightness or diameter. In a preferred embodiment, the contact device is a graphite roller which is cooled by water.

BRIEF DESCRIPTION OF THE DRAWINGS

Other features of the present invention will be more readily understood from the following detailed description of specific embodiments thereof when read in conjunction with the accompanying drawings, in which:

FIG. 1 is a perspective view of an apparatus of this invention which includes a torch assembly for heating a glass substrate tube and a device for straightening and configuring the glass tube after it has been heated;

FIG. 2 is an enlarged view of a portion of the torch assembly, a portion of the straightening and configuring device and a temperature profile across a zone of heat which traverses the tube;

FIG. 3 is an elevational view of a surface mix torch assembly which includes a plurality of nozzles;

FIG. 4 is an end view of the torch assembly of FIG. 3 taken along lines 4—4;

FIG. 5 is an elevational view in section of the torch assembly shown in FIG. 4 and taken along lines 5—5 thereof;

FIG. 6 is a detail view of a portion of the torch assembly shown in FIG. 3 and taken along lines 6—6 thereof;

FIG. 7 is an end view of a portion of the torch assembly of FIG. 3 along lines 7—7 thereof and showing two rows of nozzles;

FIG. 8 is a perspective view of the device for straightening the heated tube;

FIG. 9 is a front elevational view of a tailstock chuck of a lathe for holding an exhaust tube;

FIG. 10 is a front elevational view of an alternative embodiment of an exhaust tube retainer at the tailstock end of the glass substrate tube; and FIG. 11 is an enlarged view which shows the relative positions of the torch assembly and the straightening device which is used during a deposition mode.

DETAILED DESCRIPTION

Referring now to FIG. 1 there is shown an apparatus, designated generally by the numeral 30, for heating a glass substrate tube 31 to manufacture a silica glass preform from which are drawn lightguide fibers. The heating of the tube 31 is required in order to cause the reaction products of gases and/or dopants being fed into the tube to be fused to the inside wall of the tube to provide an optically suitable profile for communications use. The heating of the glass tube 31 is carried out while gas phase reactants are delivered to the tube. A system for this delivery is disclosed in U.S. Pat. No. 4,276,243 which issued on June 30, 1981, in the name of F. P. Partus and which is incorporated by reference hereinto.

The apparatus 30 includes facilities for causing the glass substrate tube 31 or the preform tube produced therefrom to have a central longitudinal axis which is a straight line and to have a predetermined configuration along its length. The resultant tube having a straight longitudinal axis may have a cross-sectional configuration normal to the longitudinal axis which varies along the length of the tube or one which is uniform therealong. For example, the tube may be tapered with a circular cross-section or it may be cylindrical or it may have an oval cross-sectional shape.

The apparatus 30 generally comprises a lathe 32 having a headstock 33 and a tailstock 34 which are each driven off a common shaft (not shown) and which are used to support rotatably the glass starting tube 31. The lathe 32 also includes a carriage 40 which is mounted for reciprocal movement along the lathe. Mounted on the carriage 40 is a torch assembly which is designated generally by the numeral 50 and a tube straightening and configuring portion which is designated 51. The torch assembly 50 is adapted to cause a flow of combustible gases to produce flames which are directed toward the tube 31. By confining the heat from the burning gases to a desired surface area of the tube, the torch assembly 50 establishes a zone of heat 54 (see FIG. 2) having a temperature profile at the surface of the tube. The mounting of the torch assembly 50 on the carriage 40 and its movement relative to the tube 31 causes the zone of heat to be moved along the length of the tube.

The torch assembly 50 may be constructed to be either a surface mix unit or a premix unit. In a surface mix unit, each of the two combustible gases is fed through the torch assembly 50 and are mixed together within a confinement provided between the torch assembly and the tube. On the other hand, in the premix construction, the combustible gases are premised prior to their flow through the torch assembly and into the vicinity of the confined tube 31. A brief description of the surface mix torch assembly follows. For a description of a premix torch assembly, see priorly identified U.S. Pat. No. 4,231,777 which is incorporated by reference hereinto.

The torch assembly 50 includes a housing 52 supported by a bracket 53 which is supported from a post 55 that is mounted on the carriage 40. One arrangement for mounting the bracket 53 on the carriage 40 is shown in priorly identified U.S. Pat. No. 4,231,777.

The mounting of the torch assembly 50 for movement relative to the centerline of the lathe 32 which extends between the headstock 33 and the tailstock 34 provides for variable confinement of the substrate tube 31. Through adjustment of the bracket 53, an operater may move the torch assembly 50 within any one of a range of distances from the tube 31 or to any one of a plurality of positions about and spaced from the tube. The variable confinement of the tube 31 is of help in the control of the temperature profile along successive portions of the tube 31 as the torch assembly moves reciprocally along the length of the rotating tube during a deposition mode.

As shown in FIGS. 3-5, the housing 52 of the torch assembly 50 includes a center section 62 which is disposed between two cover plates 63a-63b. An arcuately configured rear wall 66 is spaced from an arcuately configured, internally disposed bridge wall 67. The bridge wall 67 is adapted to have a plurality of radially disposed gas nozzles 68-68 extending therethrough.

Referring now to FIGS. 6-7, it can be seen that each of the nozzles 68-68 comprises a small diameter portion 69 and a larger diameter portion 70. A uniform diameter passageway 71 extends through the portions 69 and 71 of each nozzle 68. The nozzles 68-68 are mounted in the center section 66 so that an end portion of the small diameter portion of each extends through and is attached to the bridge wall 67 (see FIGS. 5 and 6).

Each of the cover plates 63a-63b includes a semi-annular lip 74 (see FIG. 6) which depends toward the nozzles 68-68 so that the nozzles are effectively clamped between the opposing lips. Outwardly facing circumferential surfaces 75-75 of the lips cooperate to form a composite arcuate surface 76 (see FIG. 3) which is effective to at least partially confine the tube 31. As can be seen in FIG. 7, the clamping of the large diameter portions 71-71 of the nozzles 68-68 forms openings 77-77 between the ends of the nozzles and between the ends of the nozzles and the lips 74-74.

As can be seen in FIGS. 3 and 6, the housing 52 includes a plurality of openings and a plurality of tunnels 78-78 which communicate with a supply of hydrogen gas. It also indicates a plurality of openings that are connected externally to a supply of oxygen gas and that are connected internally to a plurality of associated tunnels 79-79.

When they are assembled together as shown in FIGS. 3 and 6, the cover plates 63a-63b cooperate with the center plate 62 to form an outer arcuate cavity 80 and an inner arcuately shaped cavity 81. The outer cavity 80 opens to the tunnels 79-79 so that the supply of oxygen flows into the cavity 80 and then into the nozzles 68-68 which are supported in the bridge wall 67. The bridge wall 67 functions to separate the two cavities 80 and 81 and to prevent any interaction between the two combustible gases in the cavities. The cavity 81 communicates with the tunnels 78-78 so that hydrogen flows into the cavity 81 and thence outwardly through the openings 77-77 (see FIG. 7).

In the torch assembly 50, the oxygen and the hydrogen are moved through and about the nozzles 68-68 and are mixed generally along the arcuate surface 76 to produce flames which impinge on the tube 31. The flows which are emitted to the surface 76 result in flames which provide a temperature profile that is sufficient to facilitate the deposition of doped silicon dioxide and deposits on the inner surface of the tube 31.

The configuration of the torch assembly 50 is such as to produce a zone of heat 54 (see FIG. 2) with temperatures in the range of about 1800° C. The zone of heat 54 which is normally called a hot zone is a length of the tube 31 along which a temperature profile is formed by the torch assembly as it passes over the tube. The zone of heat 54 extends ahead of the torch assembly 50 and behind it. Because the torch assembly 50 moves along the tube 31, a maxirum temperature 82 within the zone of heat trails a centerline 83 of the torch assembly 50. Accordingly, the zone of heat is said to trail the torch assembly. Assuming that no adjustment to gas flow controllers is made, the faster the torch assembly is moved, the greater the distance between the maximum temperature 82 of the heat zone and the centerline 83 of the torch.

It is important that the housing 52 and the walls of the nozzles 68-68 are cooled in order to provide a clean gas which prevents oxidation and resulting flaking of the material of which the housing and the walls are made. A coolant, such as chilled water, for example, is fed into each of two conduits 93-93 (see FIGS. 3 and 4) and directed through semi-annular channels 94-94 (see also FIG. 6). From the channels 94-94, the coolant moves into exit conduits 96-96 and out of the assembly 50 for recirculation.

The distance between the arcuate curved surface 76 of the surface mix torch assembly 50 and the tube 31 to which the nozzles 68-68 open is spaced generally in the range of about 0.5 to 2 cm. For example, in the surface mix torch assembly 50, that distance is about 0.5 to 2 cm. This distance may vary as between the deposition portion of the preform manufacture and that portion of the process during which the tube 31 is collapsed into a solid rod from which lightguide fiber is drawn.

Going now to the preform tube straightening and configuring portion 51 of the apparatus 30, it is seen from FIGS. 1 and 8 that a tube contact device 101 is positioned adjacent to the torch assembly 50. In a preferred embodiment, the contact device 101 includes a roller 102 which is made of graphite. The roller 102 is mounted rotatably in bearings 104-104 that are supported in a housing 106. The contact device may take other forms such as for example, a metallic tube.

As can also be seen in FIG. 8, the contact device 101 is mounted on an arm 107 of the torch bracket 53, but could just as well be supported from the torch assembly 50 or directly supported from carriage 40 (see FIG. 1). Further, it is positioned on the trailing side of the torch assembly 50 as defined in a collapse mode, and in an operated position in the preferred embodiment, is below the glass tube 31 which is destined to become the preform.

The contact device 101 is mounted for movement vertically. The vertical movement may be provided by a rack and pinion arrangement as shown in FIG. 8, a screw and bushing arrangement, or other equivalent mechanism. In the rack and pinion arrangement, a rack 109 extends through a housing 111 which supports a pinion (not shown) in meshed engagement with the rack. The pinion is adapted to be turned by a crank 113 or a motor (not shown) to cause the straightening portion 51 to be raised or lowered. Vertical movement of the contact device 101 may be controlled manually or through a feedback loop when the tube is being configured to a predetermined configuration. The profile of the substrate tube as received from a supplier may be determined prior to its mounting in the lathe 32. That profile may be used to control the vertical movement of the contact device 101 to cause the tube to be configured to a desired profile along its length.

In a preferred embodiment, the straightening portion 51 of the apparatus 30 includes facilities for causing the surface that engages the tube 31 to have a temperature that is substantially below that of the preform. The housing 106 is adapted to hold a coolant such as deionized water which may be supplied by tubes 114-144 (see FIG. 8). The water is applied over the surface of the roller 102 to clean the surface of the roller, which engages the tube 31. The water drains from the housing through a passageway (not shown) in the rack 109. Also, the water forms an interface between the roller 102 and the tube 31 which functions as a cushion to prevent damage to the surface of the tube. While in the preferred embodiment, the contact device 101 is cooled, it has been found that a contact device which comprises hot graphite having a temperature above ambient, for example, also can be used to straighten the substrate tube 31.

During the manufacture of the preform with the apparatus 30, a glass tube 31 is positioned in the lathe with one of its ends in the headstock 33 and with its other end connected by a welded joint 118 (see FIG. 1) to an exhaust tube 119. The exhaust tube 119 is supported in the tailstock 34 of the lathe 32. The tube 31 is rotated as the torch assembly is moved in a plurality of passes in a direction from the headstock 33 to the tailstock 34. During each pass, doped reactants are moved into the tube from its headstock end while spent gases are exhausted at the tailstock end. For a description of methods and apparatus for exhausting these gases, see U.S. Pat. No. 4,278,459 which issued on July 14, 1981 in the name of F. P. Partus and which is incorporated by reference hereinto.

Following deposition in a preferred embodiment, the wall of the tube is pinched together adjacent to its tailstock end. This prevents the entry of moisture and other contaminants into the tube 31 while it is being collapsed.

Then the doped glass tube 31 is collapsed into a solid preform preparatory to drawing. During the collapse mode, the heating, at a higher temperature than during deposition, occurs as the torch assembly 50 moves in a number of passes from tailstock to headstock. At the end of each pass during the collapse mode, the carriage is returned rapidly to the tailstock for the beginning of another cycle. Although the direction of travel of the torch assembly 50 in its operative condition during the collapse mode is opposite to that in the deposition mode, it may be the same. In that event, the tube 31 is not pinched off completely at the tailstock end in order to allow for the removal of gases. Otherwise, an undesirable pressure build-up in the tube could occur.

Prior to or during the first pass of the collapse mode, the graphite support roller 102 is moved upwardly to contact the rotating glass tube 31. This may be done manually or automatically. Its vertical position is a function of the tube diameter and ovality at the tailstock end and of the configuration desired for the preform tube. The roller is pushed into the softened glass within the moving zone of heat a predetermined distance behind the centerline of the torch assembly 50. If necessary, the contact device 101 is effective to force the glass tube 31 into alignment with the centerline between the headstock 33 and the tailstock 34. Accordingly, the roller 102 is adapted to urge each successive increment of length of the tube 31 upwardly until it is disposed substantially concentrically about the centerline between the chucks of the lathe 32.

The engagement of the roller with the tube 31 imparts a horizontal force to the tube which is directed from the tailstock to the headstock. This tends to cause the exhaust tube 119 to which the tube 31 is welded to become loose in the chuck which would result in an unreconcilable offset or bowing of the tube. In order to prevent such slippage, a bead 121 (see FIG. 9) is formed on the exhaust tube 119 adjacent to an outer side 122 of the chuck of the tailstock 34. In the alternative, a clamp 124 (see FIG. 10) is positioned about the exhaust tube 119 adjacent to the outer side 122 of the tailstock chuck. Any forces imparted to the exhaust tube 119 from tube 31 will be resisted by the engagement of the bead 121 or the clamp 124 with the chuck.

After the straightening pass, the operator lowers the support roller 102 and causes the carriage to return to the tailstock. Should the tube 31 not be straightened after the first pass, the operator may raise the roller 102 on subsequent passes in the same manner as that during the initial pass. Seconds after the carriage begins its next pass, the roller 102 is moved upwardly until it just contacts the tube 31.

Then the operator begins or continues with the collapse of the preform tube, depending on whether the straightening was accomplished prior to or during the first pass of the collapse mode. During straightening and during collapse, a controlled positive pressure inside the tube is of assistance in maintaining circularity as the tube is collapsed. This positive pressure counteracts the pressure which is exerted by the graphite roller 102 on the outer surface of the tube. This reaction is necessary to prevent the tube 31 from going flat or oval in the softened zone of the glass adjacent to the roller 102.

As will be recalled, the tailstock end of the tube 31 is pinched off in a preferred embodiment prior to collapse to prevent the entry of contaminants. Although this is not necessary, it is helpful in maintaining the positive pressure inside the tube 31 to prevent the formation of any irregularities in the tube at the point ot its engagement by the contact device 101.

Parameters which are important to the method of straightening and configuring the tube are the temperature of the glass within the zone of heat, the carriage speed and the position of the engagement of the contact device with the tube 31 relative to the zone of heat 54. The zone of heat is formed in the vicinity of the torch assembly as the torch passes along the tube 31, but, as will be recalled, it is usually not centered with respect to the centerline of the torch and trails it (see FIG. 2). The distance by which its maximum temperature lags the torch assembly is a function of the velocity of the torch assembly; the greater the velocity, the greater the trailing distance. The distance is also a function of the diameter of the tube 31 and its thickness. For a tube having an infinitely thin wall and relatively high conductivity, the maximum temperature of the hot zone is centered with respect to the torch centerline. Inasmuch as the tube 31 has a thickness and the torch assembly 50 is moving along the tube, the hot zone lags the torch assembly.

The contact device 101 must engage the glass tube 31 at a point where the glass can be reconfigured. Also, the arrangement of the torch assembly 50 and the contact device 101 must be such that the glass will take a set after its engagement with the roller 102. The point of engagement must not be at a point where subsequently the glass experiences a higher temperature, which would remove the set.

Inasmuch as the location of the hot zone is difficult to ascertain, the roller 102 may be referenced to the centerline 83 of the torch assembly 50. A distance "$d_1$" (see FIG. 2) between the centerline of the torch assembly 50 and a center axis 126 of the roller 102 is called the trailing distance and occurs where the increment of length of glass is soft enough to be reconfigured without fracturing or surface stressing the glass. Also, the increment engaged by the roller 102 must be cool enough afterwards to retain that reconfiguration as the graphite support moves on to the next successive increment along the length of the tube. In the preferred embodiment, the water which is flowed over the graphite roller 102 ideally provides a moving cold zone which helps to establish a set in the tube which is being progressively straightened.

In a preferred embodiment, the distance "$d_1$" is on the order of 3.8 cm. Should the distance exceed an established range, the glass which is contacted by the roller would be too cool to be successfully reconfigured. Excessive amounts of gas would have to be used to compensate for the excessive spacing of torch assembly 50 and roller 102.

The water cooling of the roller 102 is helpful in preventing the roller from adhering to the glass tube 31. Also, the water is effective to flush any ablations caused by the flames from the tube. Otherwise, these could cause dust particle accumulations which could become deposited on the graphite roller and be impressed into the glass by the roller resulting in stress points in the tube and subsequent low strength fiber.

Because the glass is softened at the end of its straightening pass or passes, the tube 31 may sag slightly and cause an offset when the graphite support is lowered. To prevent this, a programmed delay has been incorporated into the carriage return pass after the torch oxygen has been vented. This allows the surface of the tube 31 to cool sufficiently while it is still supported by the graphite roller 102, yet allows ample time in which to lower the contact device for the return pass.

As might be expected, the engagement of the roller 102 with the tube 31 causes an impression on the outer surface of the tube. The impression generally takes the form of a scroll. It has been found that if the contact device 101 is required to engage the tube only during the first pass of the collapse mode, the majority of the impression is removed during subsequent passes. However, the impression persists in those cases when the contact device 101 must be used for passes in addition to the initial one. In order to reduce the pitch of the impression, the rotation of the tube 31 during straightening is increased or maintained at least at the speed used during deposition. Then when the preform tube is subjected to the collapse mode, the rotational speed is substantially reduced. At the conclusion of the collapse process, two flame polishing passes are used to remove any contaminating marks on the outer surface of the tube which have been caused by the roller 102.

In a preferred embodiment, straightening is not performed during a deposition mode in which the torch assembly 50 and the contact device 101 are arranged as shown in FIGS. 1 and 8. As will be recalled, the maximum temperature of the zone of heat 54 falls between the centerline 83 of the torch assembly 50 and the roller 102. The physical arrangement of the torch assembly 50 and the contact device 101 does not permit the roller 102 to be sufficiently close to the centerline of the torch assembly 50 to engage the tube 31 at the location of the maximum temperature in the zone of heat. The temperature of the glass tube at the point of engagement during the deposition mode is not sufficient to allow straightening. If the temperature were raised during the deposition mode, some of the doped reactants which are deposited on the inner wall of the tube 31 would revaporize thereby decreasing the amount of dopants in the deposited layers.

It is within the scope of this invention to straighten the tube during deposition. This is accomplished by rotating the torch assembly 50 to a position above the tube (see FIG. 11). The contact device is positioned in engagement with the underside of the tube 31 so that it trails slightly behind the centerline of the torch assembly 50 as the carriage 40 is moved in each deposition pass. As seen in FIG. 11, the roller 102 is positioned a distance $d_2$ behind the centerline 83 of the torch assembly 50 and is aligned approximately with the maximum temperature of the zone of heat.

Although the methods and apparatus of this invention have been described in terms of straightening a preform tube having a circular cross-section, the invention is not so limited. For example, in some applications it may be desirable to produce a straight preform tube having an oval cross-section. In that application, the apparatus 30 is modified to include a springbiased roller. In this way, the roller is moved vertically as the different portions of the oval tube engage it. The apparatus of this invention is also useful in straightening a substrate tube which has a circular cross-section but in which the diameter varies along its length. In that situation, the contact device 101 is mounted so that it is biased into engagement with the substrate tube. In the alternative, the roller 102 is moved upwardly or downwardly as a function of the diameter of the tube 31 which is measured as the torch assembly 50 and the contact device 101 traverse the tube.

Further, as will be recalled, the portion 51 of the apparatus 30 is capable of being used to configure a glass substrate to have a predetermined cross-sectional configuration along its length. A glass tube having a constant outer diameter, circular cross-section may be configured to have a varying diameter, for example. The contact device 101 is also capable of causing a glass substrate which has a varying diameter transversely of its longitudinal axis to be configured to have a constant outer diameter along its length.

As an example of causing a glass tube to have a constant outer diameter, the methods of this invention could be used to round out as well as to straighten tubes which are received from suppliers and which may be tapered. Pressurized gas is fed into the tube 31 which is supported in the lathe 32. Then the contact device 101 is moved into engagement with the tube 31 as it is rotated and as the torch assembly 50 is passed along the length of the tube. The position of the contact device 101 at each increment along the tube 31 is a function of the diameter of the tube. This process is referred to as pressure polishing. Subsequently, during the deposition mode, the roller 102 is caused to be held in engagement with the tube 31 to maintain its straightness.

It is also within the scope of this invention to straighten a preform tube which is disposed vertically. For such use, the contact device 101 may require two rollers with one being disposed on each side of the vertically disposed tube.

It is to be understood that the above-described arrangements are simply illustrative of the invention. Other arrangements may be devised by those skilled in the art which will embody the principles of the invention and fall within the spirit and scope thereof.

What is claimed is:

1. A method of configuring an elongated glass substrate from which lightguide fiber is drawn, said method including the steps of:
   supporting each end of the substrate;
   exposing an outer surface of each successive increment of length of the substrate to a zone of heat having a temperature profile by causing relative motion between the zone of heat and the substrate; while
   causing rotation of the substrate by turning its supported ends; and
   causing the substrate to have a central longitudinal axis which is a substantially straight line and to have a predetermined configuration along its length by applying forces in a reproducible manner to successive increments of length of the substrate during exposure to and in a fixed relation to the zone of heat, said forces being applied to each successive increment of length at a distance as measured along the length of the substrate after each successive increment has been exposed to at least an initial portion of the zone of heat.

2. The method of claim 1, wherein the substrate has a circular cross-section and is turned about a rotary path of travel, and the zone of heat is provided by a torch which is moved in a direction along the substrate from one end of the substrate toward the other and which is disposed about one portion of the rotary path of travel of the outer surface of the substrate, the forces being applied along the portion of the rotary path of travel by a device which is in tandem with and spaced a predetermined distance from the torch with the spatial relation of the applied forces and the zone of heat being fixed as a function of the velocity of the torch.

3. The method of claim 1, wherein the substrate is a circular tube which is configured to have an outer diameter that is constant along the length of the tube.

4. The method of claim 1, wherein the substrate is a circular tube which is configured to have an outer diameter that varies along the length of the tube.

5. The method of claim 2, wherein the step of applying forces to the elongated glass substrate is accomplished with a contact device which is cooled to a temperature substantially below that of the outer surface of the glass substrate in the zone of heat.

6. The method of claim 1, wherein the zone of heat is provided by a torch which is moved in a direction along the substrate from one end of the substrate toward the other and wherein a maximum temperature of the zone of heat trails a centerline of the torch, and wherein the point at which the forces are applied trails the maximum temperature of the zone of heat.

7. The method of claim 1, wherein the glass substrate is a tube and said method also includes the step of maintaining a positive pressure within the tube during the exposure of the tube to the zone of heat.

8. The method of claim 7, wherein subsequent to the step of applying forces to the successive increments, said method also includes the steps of:
   heating the outer surface of the tube to a temperature within a first range by directing a plurality of flames toward successive increments of length of the tube; while
   depositing doped reactants into the tube to form a preform tube having a predetermined profile; and
   supporting the tube following its exposure to the flames to maintain the tube straight between its ends.

9. The method of claim 1, wherein the forces are applied in a manner to cause corresponding portions of each successive increment to be disposed at equal distances from the central longitudinal axis.

10. The method of claim 6, wherein a distance between a reference axis of the torch and the point at which the forces are applied is a function of the velocity of the torch.

11. A method of making a preform tube from a glass substrate tube having a generally circular cross-section, said method comprising the steps of:
   supporting the substrate tube at its ends for rotation;
   exposing each successive increment of length of the outer surface of the substrate tube to a zone of heat having a temperature profile and a maximum temperature within a first range by causing relative motion between the zone of heat and the substrate tube; while
   turning the supported ends to cause the substrate tube to be turned about a rotary path of travel; and depositing doped reactants into the substrate tube to form a preform tube having a predetermined profile; then moving a contact device into engagement with the preform tube along a portion of the rotary path of travel; and exposing each successive increment of length of the outer surface of the preform tube to a torch which is disposed along the portion of the rotary path of travel and which provides a zone of heat having a temperature profile and a maximum temperature within a second range that is higher than the first range by causing relative motion between the torch and the preform tube; while causing the preform tube to have a central longitudinal axis which is a substantially straight line by causing relative motion between the contact device and successive increments of length of the preform tube during their exposure to the zone of heat of the second range with the contact device being spaced from the torch a distance as measured along the length of the tube to cause each successive increment to be engaged by the contact device along the portion of the rotary path of travel after it has been exposed to at least an initial portion of the zone of heat, the step of engaging being sufficient to cause each successive increment of the preform to be disposed substantially concentrically about an axis which extends between the supported ends of the tube.

12. The method of claim 11, wherein the preform tube is engaged at a predetermined position relative to the torch.

13. The method of claim 11, wherein said step of moving a contact device into engagement with the preform tube is accomplished with a contact device which is cooled to a temperature substantially below that of the outer surface of the preform tube in the zone of heat in the second range.

14. The method of claim 12, wherein the zones of heat are provided by a torch which is moved in a number of passes at a first velocity in one direction during said step of depositing and at a second velocity in a direction opposite to the one direction during the step of causing the preform tube to have a longitudinal axis which is substantially straight, the torch being returned in an opposite direction to an initial position after each pass and the heating of the preform tube to a temperature within the second range is accomplished as the zone of heat is moved at the second velocity along the preform tube.

15. The method of claim 11, wherein the step of supporting the substrate tube also includes restraining the tube against movement in a direction along its longitudinal axis as relative motion is caused between the contact device and the substrate tube.

16. An apparatus for causing an elongated glass substrate to have a predetermined configuration, said apparatus including:

means for supporting each end of the substrate for rotation;

heating means for producing a zone of heat having a temperature profile;

means for causing relative motion between the substrate and said heating means along a longitudinal axis of the substrate to cause each successive increment of length of the outer surface of the substrate to be exposed to the zone of heat;

means for causing rotation of the substrate by turning its ends; and contact means spaced from said heating means as measured along the axis of the substrate for causing the substrate to have a central longitudinal axis which is a substantially straight line and to have a predetermined configuration, said contact means applying forces in a reproducible manner to successive increments of length of the substrate during exposure to and in a fixed relation to the zone of heat after each successive increment has been exposed to at least an initial portion of the zone of heat.

17. The apparatus of claim 16, wherein said means for causing rotation causes the substrate to be turned about a rotary path of travel and said heating means is disposed along a portion of the rotary path of travel and wherein said contact means for applying forces to the elongated glass substrate engages the substrate along the portion of the rotary path of travel and includes a surface which is cooled to a temperature substantially below that of an outer surface of the glass substrate in the zone of heat.

18. The method of claim 16, wherein said glass substrate is a tube and said apparatus also includes means for maintaining a positive pressure within the tube during the heating of the tube.

19. The apparatus of claim 18, wherein said heating means also includes means for heating the outer surface of the tube to a temperature within a first range by directing a plurality of flames toward successive increments of length of the tube, said heating means producing the zone of heat causing the outer surface to have a temperature within a second range which is higher than the first range;

means rendered effective as each successive increment is exposed to a temperature within the first range for depositing doped reactants into the tube to form a preform tube having a predetermined profile; and means supporting the successive increments of the preform tube at a location following exposure to the flames to maintain the tube straight between its ends.

20. The apparatus of claim 16, wherein said contact means causes the forces to be applied in a manner that causes corresponding portions of each successive increment to be disposed at equal distances from the central longitudinal axis.

21. The apparatus of claim 20, wherein said heating means includes a torch assembly, said apparatus also including means for moving said torch assembly along the glass substrate with a distance between a centerline of said torch assembly and the point at which said contact means applies forces to said substrate being a function of the velocity of said torch assembly.

22. The apparatus of claim 21, wherein the distance is such as to cause the point of application of the forces to an increment of length to be at a predetermined position relative to the temperature profile across the zone of heat.

23. The apparatus of claim 16, wherein said supporting means includes means for restraining movement of the substrate against movement in a direction along its longitudinal axis as said contact means causes forces to be applied to the substrate.

24. An apparatus for making a preform tube having a generally circular cross-section from a glass substrate tube, said apparatus including:

supporting means for holding ends of the substrate tube to allow the tube to be turned through a rotary path of travel;

torch means for heating the substrate tube, said means including means for directing a flow of combustible gases toward the substrate tube to provide a zone of heat having a temperature profile, said torch means including means for providing a confinement of the heat to a portion of the length of the substrate tube and to a portion of the rotary path of travel to control the temperature along the portion of the length of the substrate tube;

means for moving said torch means along the substrate tube in a direction along a longitudinal axis of the tube to cause successive increments of the length of the substrate tube to be heated and to cause the zone of heat to traverse the tube;

means for rotating the substrate tube about its ends;

means for depositing doped reactants into the substrate tube to form a preform tube having a predetermined profile; and contact means in tandem with said torch means and moved therewith relative to the tube for engaging along the portion of the rotary path of travel each successively heated increment of the preform tube after the doped reactants have been deposited to cause each successive increment to be disposed substantially concentrically about an axis which extends through said supporting means, said contact means engaging each successive increment of length after each successive increment has been passed by a centerline of said torch means.

25. The apparatus of claim 24, wherein said torch means is moved in a first direction along the substrate tube in a number of passes to heat the tube, and said contact means is adjustably mounted to permit movement inwardly and outwardly with respect to the longitudinal axis of the tube.

26. The apparatus of claim 24, wherein said torch means causes the temperature of the outer surface of the substrate tube to be raised to a first temperature as said torch means is moved in a first direction along the substrate tube.

27. The apparatus of claim 26, wherein subsequent to the deposition of doped reactants in the substrate tube, said torch means is caused to be moved in at least one operative pass in a second direction opposite to the first direction and to cause the temperature of the outer surface of the substrate tube to be raised to a second temperature which is higher than the first temperature to straighten the preform tube prior to the collapse of the preform tube into a preform and said contact means for engaging each increment is rendered effective at least prior to the collapse of the preform tube into the preform.

28. The apparatus of claim 25, wherein said contact means includes a surface having a temperature substantially below that of an outer surface of the preform tube.

29. The apparatus of claim 28, wherein said contact means is a rotatably mounted member with its axis of rotation being transverse to the longitudinal axis of the preform tube.

30. The apparatus of claim 29, wherein said member is a roller which is made of graphite.

31. The apparatus of claim 30, wherein said rotatably mounted roller is cooled as it is caused to rotate by its engagement with the preform tube as said roller is moved along the preform tube.

32. The apparatus of claim 29, wherein said contact means is a metallic tube, the axis of which is disposed transversely of the axis of the substrate tube and wherein said apparatus also includes means for flowing a coolant through said metallic tube.

* * * * *